US008580223B2

(12) United States Patent
Rao et al.

(10) Patent No.: US 8,580,223 B2
(45) Date of Patent: Nov. 12, 2013

(54) METHODS AND COMPOSITIONS FOR THE SEPARATION OF SINGLE-WALLED CARBON NANOTUBES

(75) Inventors: Chintamani Nagesa Ramachandra Rao, Bangalore (IN); Subi Jacob George, Bangalore (IN); Rakesh Voggu, Bangalore (IN); Kotagiri Venkata Rao, Bangalore (IN)

(73) Assignee: Jawaharlal Nehru Centre for Advanced Scientific Research, Bangalore (IN)

( * ) Notice: Subject to any disclaimer, the term of this patent is extended or adjusted under 35 U.S.C. 154(b) by 26 days.

(21) Appl. No.: 13/552,417

(22) Filed: Jul. 18, 2012

(65) Prior Publication Data

US 2012/0286215 A1    Nov. 15, 2012

Related U.S. Application Data

(62) Division of application No. 13/078,154, filed on Apr. 1, 2011, now Pat. No. 8,246,928.

(51) Int. Cl.
| | |
|---|---|
| C09C 1/56 | (2006.01) |
| D01F 9/12 | (2006.01) |
| D01C 5/00 | (2006.01) |
| B01J 19/08 | (2006.01) |
| B03B 5/00 | (2006.01) |
| B07B 9/00 | (2006.01) |

(52) U.S. Cl.
USPC .......... 423/460; 423/447.1; 423/447.2; 423/447.3; 423/445 B; 209/155; 209/17; 977/845

(58) Field of Classification Search
None
See application file for complete search history.

(56) References Cited

U.S. PATENT DOCUMENTS

| 7,374,685 B2 | 5/2008 | Sun | |
| 8,241,946 B2 * | 8/2012 | Setayesh et al. ............... | 438/99 |
| 2007/0221913 A1 * | 9/2007 | Lee et al. ....................... | 257/40 |

OTHER PUBLICATIONS

Hirsch et al.; Nanotube Surfactant Design: The Versatility of Water-Soluble Perylene Bisimides; Adv. Mater.; 22, pp. 788-802; published online Dec. 22, 2009.*
Arnold, et al., Sorting carbon nanotubes by electronic structure using density differentiation, *Nat Nanotechnol.* (Oct. 2006), 1(1):60-65 (Abstract).
Chen, et al., Toward the extraction of single species of single-walled carbon nanotubes using fluorene-based polymers, *Nano Lett.* (Oct. 2007), 7(10):3013-3017 (Abstract).
Das, et al., Doping in carbon nanotubes probed by Raman and transport measurements, *Phys Rev Lett.* (Sep. 28, 2008), 99(13):136803 (Abstract).

(Continued)

*Primary Examiner* — Curt Mayes
*Assistant Examiner* — Guinever Gregorio
(74) *Attorney, Agent, or Firm* — Pepper Hamilton LLP

(57) ABSTRACT

Embodiments herein describe a composition including at least one water-soluble complex having a water-soluble separation agent including a planar portion, at least one pi electron on the planar portion and at least one electron withdrawing group; and a semiconducting single-walled carbon nanotube in an aqueous solution. Further embodiments describe a method of separating metallic single-walled carbon nanotubes and semiconducting single-walled carbon nanotubes including providing carbon nanotubes having an admixture of semiconducting single-walled carbon nanotubes and metallic single-walled carbon nanotubes; and combining the admixture with a water-soluble separation agent in an aqueous solution to form a mixture, in which the water-soluble separation agent includes a planar portion, at least one pi electron on the planar portion and at least one electron withdrawing group.

5 Claims, 9 Drawing Sheets

(56) References Cited

OTHER PUBLICATIONS

Ghosh, et al., Noncovalent functionalization, exfoliation, and solubilization of grapheme in water by employing a fluorescent coronene carboxylate, *Chemistry* (Mar. 1, 2010), 16:2700-2704.

Ghosh, et al., Separation of metallic and semiconducting single-walled carbon nanotubes through fluorous chemistry, *Nano Res.* (Dec. 2008), 2:183-191.

Kataura, et al., Optical properties of single-wall carbon nanotubes, *Synthetic Metals* (1999), 103:2555-2558.

Komatsu et al., A Comprehensive Review on Separation Methods and Techniques for Single-Walled Carbon Nanotubes, *Materials* (Jun. 30, 2010), 3:3818-3844.

Krurpke, et al., Separation of metallic from semiconducting single-walled carbon Nanotubes, *Science* (Jul. 18, 2003), 301(5631):344-347 (Abstract).

Liu, et al., Tandem extraction strategy for separation of metallic and semiconducting SWCNTs using condensed benzenoid molecules: effects of molecular morphology and solvent, *Phys Chem Chem Phys* (Sep. 7, 2009), 11(33):7257-7267.

Maeda, et al., Large-scale separation of metallic and semiconducting single-walled carbon nanotubes, *J Am Chem Soc.* (Jul. 27, 2005), 127(29):10287-10290 (Abstract).

Moshammer, et al., Selective suspension in aqueous sodium dodecyl sulfate according to electronic structure type allows simple separation of metallic from semiconducting single-walled carbon nanotubes, *Nano Res*. (May 2009), 2:599-606.

Rao, et al., Selective generation of single-walled carbon Nanotubes with metallic, semiconducting and other unique electronic properties, *Nanoscale* (Oct. 21, 2009), 1(1):96-105 (Abstract).

Rao, et al., Nanotubes and Nanowires, RSC Nanoscience & Technology, *Royal Society of Chemistry*, Cambridge (2005).

Saito, et al., Physical Properties of Carbon Nanotubes, *Imperial College Press*, London (1998).

Strano, et al., Electronic structure control of single-walled carbon Nanotube functionalization, *Science* (Sep. 12, 2003), 301(5639):1519-1522 (Abstract).

Varghese, et al., Selectivity in the interaction of electron donor and acceptor molecules with grapheme and single-walled carbon Nanotubes, *J. Phys. Chem.* C (Sep. 8, 2009), 113(39):16855-16859 (Abstract).

Vivekchand, et al., The problem of purifying single-walled carbon Nanotubes, *Small* (Oct. 2005), 1(10):920-923 (Abstract).

Voggu, et al., Extraordinary sensitivity of the electronic structure and properties of single-walled carbon nanotubes to molecular charge-transfer, *J. Phys. Chem. C*. (Aug. 5, 2008), 112(34):13053-13056 (Abstract).

Voggu, et al., A simple method of separating metallic and semiconducting single-walled carbon nanotubes based on molecular charge transfer, *J Am Chem Soc* (Apr. 28, 2010), 132(16):5560-5561 (Abstract).

Zheng, et al., Structure-based carbon Nanotube sorting by sequence-dependent DNA assembly, *Science* (Nov. 28, 2003), 302(5650):1545:1548 (Abstract).

Backes et al., Nanotube Surfactant Design: The Versatility of Water-Soluble Perylene Bisimides, *Advanced Materials* (Dec. 22, 2009), 22(7):788-802.

Campidelli et al., Separation of Metallic and Semiconducting Single-Walled Carbon Nanotubes via Covalent Functionalization, *Small* (Sep. 5, 2007), 3(10):1672-1676 (Abstract).

Lu et al., Selective Interaction of Large or Charge-Transfer Aromatic Molecules with Metallic Single-Wall Carbon Nanotubes: Critical Role of the Molecular Size and Orientation, *J. Am. Chem. Soc.* (Mar. 23, 2006), 128(15):5114-5118 (Abstract).

Ménard-Moyon et al., Separation of Semiconducting from Metallic Carbon Nanotubes by Selective Functionalization with Azomethine Ylides, *J. Am. Chem. Soc.* (Apr. 29, 2006), 128(20):6552-6553.

Chen et al., Bulk Separative Enrichment in Metallic or Semiconducting Single-Walled Carbon Nanotubes, *Nano Letters* (Aug. 20, 2003), 3(9):1245-1249 (Abstract).

Ghosh et al., Noncovalent Functionalization, Exfoliation, and Solubilization of Graphene in Water by Employing a Fluorescent Coronene Carboxylate, *Chemistry—A European Journal* (Jan. 27, 2010), 16(9):2700-2704 (Abstract).

\* cited by examiner

METHODS AND COMPOSITIONS FOR THE SEPARATION OF SINGLE-WALLED CARBON NANOTUBES

CROSS REFERENCE TO RELATED APPLICATIONS

This application is a divisional of and claims priority to U.S. patent application Ser. No. 13/078,154, now U.S. Pat. No. 8,246,928, filed on Apr. 1, 2011, the contents of which are herein incorporated by reference in their entirety.

A. BACKGROUND

Since the discovery of carbon nanotubes, several methods have been reported for the synthesis of multi-walled, double-walled and single-walled carbon nanotubes. Methods for synthesis of carbon nanotubes include arc-evaporation of graphite, laser ablation, chemical vapor deposition (CVD) and vapor phase decomposition or disproportionation of carbon-containing molecules. Among the various types of carbon nanotubes, single-walled carbon nanotubes (SWNTs) are of special interest because of their unique properties and potential applications. Single-walled carbon nanotubes exhibit electronic, thermal, and mechanical properties with several possible applications. SWNTs may be semiconducting, semi-metallic, or metallic depending on the geometrical structure. Applications of SWNTs can generally be divided into semiconducting applications and metallic applications. Unfortunately, most, if not all, formation methods provide a mixture of both metallic and semiconducting SWNTs. As such, great interest is currently being shown in the development of methods that produce only one or the other type of SWNT as well as in the development of methods to separate the two species following formation.

The spatial orientation of the carbon nanotube is represented by a pair of indices (n,m) called the chiral vector. The integers n and m denote the number of unit vectors along two directions in the honeycomb crystal lattice of the graphene sheet. The values of n and m determine the chirality, or "twist" of the nanotube. The chirality in turn affects the conductance of the nanotube, its density, its lattice structure, and other properties. Nanotubes having chiral numbers n=m are metallic and quasi-metallic if n−m is divisible by 3, while all the other nanotubes are generally semiconducting. In conventional synthetic processes for SWNTs, such as the carbon arc discharge method, metallic nanotubes constitute about one-third of SWNTs, the remaining being semiconducting nanotubes. The use of SWNTs in electronics, sensor technology and other areas depends on whether the nanotubes used are metallic or semiconducting. Metallic SWNTs may function as conductive additives and as leads in nanoscale circuits, while the semiconducting ones may be used to design field effect transistors. SWNTs mixtures of metallic and semiconducting nanotubes limit their applicability. Even in those processes such as the dual laser pulse method, that preferentially form one type of SWNT over the other, the product will generally still contain some portion of the other type, and the presence of the undesired type in the product sample can frustrate if not completely destroy the desired application of the product SWNTs.

Accordingly, in the last few years, several methods have been devised to separate semiconducting and metallic nanotubes. Methods to separate metallic and semiconducting SWNTs include dielectrophoresis, density gradient centrifugation, ultracentrifugation, and selective destruction of one type of nanotube by irradiation or by chemical means, selective interaction with molecules and covalent or non-covalent functionalization.

Other methods include preferential charge-transfer interaction of bromine with the metallic species over the semiconducting species in surfactant-stabilized SWNTs, followed by centrifugation, has been used to separate semiconducting from metallic SWNTs. Additionally, derivatized porphyrins have been used which selectively interact with semiconducting SWNTs through non-covalent interaction. Such interaction may be employed to dissolve the semiconducting species in organic solvent, leaving the metallic species as residue. Photochemical osmylation has been employed to selectively react metallic SWNTs with osmium tetroxide. Subsequent self-aggregation results in the separation of the metallic and semiconducting SWNTs. However, these methods do not yield a high purity and repeat performance of the procedure is required for effective separation.

Other techniques attempt to effect the separation of semiconducting and metallic SWNTs by employing fluorous chemistry, in which the diazonium salt of 4-heptadecafluorooctylaniline reacts preferentially with metallic SWNTs present in the mixture of nanotubes. However, this protocol is very complicated.

Furthermore, these approaches do not always allow bulk scale separation with high selectivity and require cumbersome ultracentrifugation. It is, therefore, highly desirable to find a simple and scalable strategy for the separation of SWNT mixtures.

B. SUMMARY

Some embodiments herein describe a composition including at least one water-soluble complex having a water-soluble separation agent including a planar portion, at least one pi electron on the planar portion and at least one electron withdrawing group; and a semiconducting single-walled carbon nanotube in an aqueous solution.

Further embodiments describe a method of separating metallic single-walled carbon nanotubes and semiconducting single-walled carbon nanotubes including providing carbon nanotubes having an admixture of semiconducting single-walled carbon nanotubes and metallic single-walled carbon nanotubes; and combining the admixture with a water-soluble separation agent in an aqueous solution to form a mixture, in which the water-soluble separation agent includes a planar portion, at least one pi electron on the planar portion and at least one electron withdrawing group.

The foregoing summary is illustrative only and is not intended to be in any way limiting. In addition to the illustrative aspects, embodiments, and features described above, further aspects, embodiments, and features will become apparent by reference to the drawings and the following detailed description.

C. BRIEF DESCRIPTION OF THE FIGURES

D. DETAILED DESCRIPTION

Figure 1:
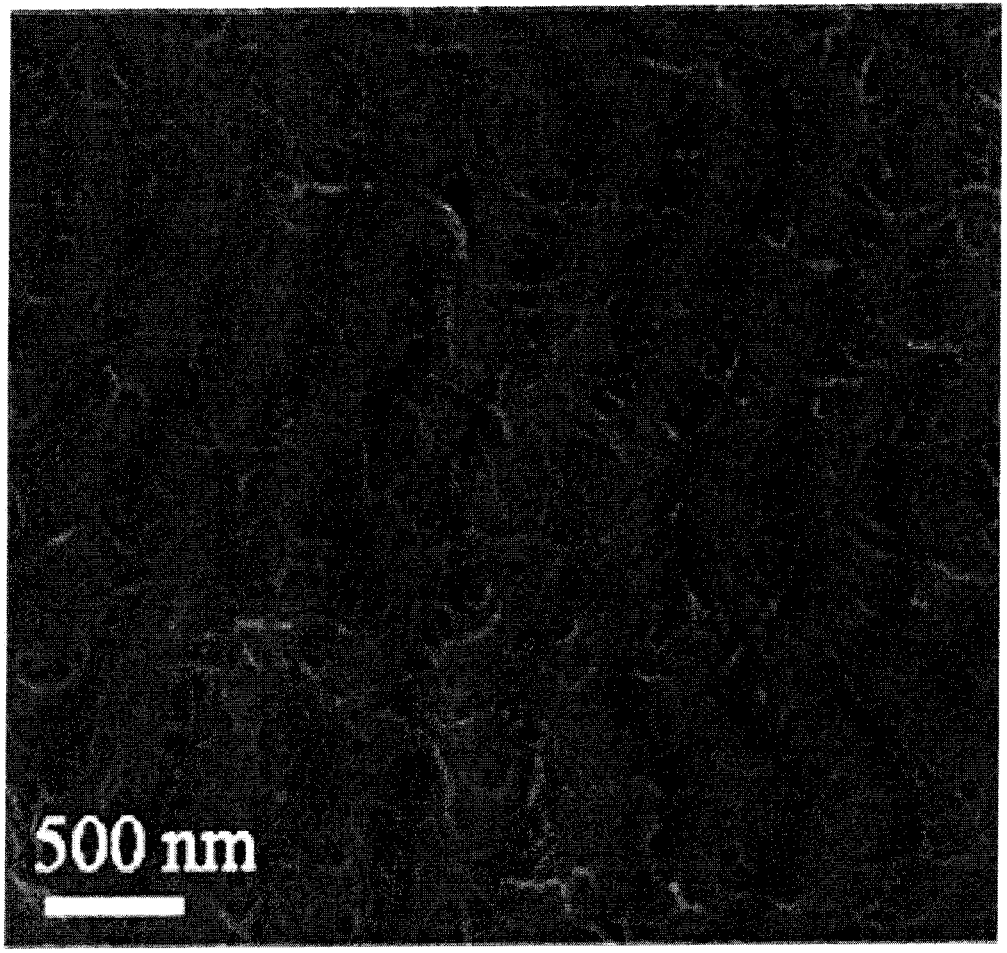
FIG. 1 is a field-emission scanning electron microscope (FESEM) image of metallic single-walled carbon nanotubes produced according to an embodiment described herein.

As used in the present disclosure, "metallic single-walled carbon nanotubes" include metallic single-walled carbon nanotubes having chiral numbers n=m and semi-metallic single-walled carbon nanotubes where (n−m)/3 is an integer. In particular, the term "metallic single-walled carbon nanotube" refers to any single-walled carbon nanotube that is not a semiconducting single-walled carbon nanotube.

As used in the present disclosure, "semiconducting single-walled carbon nanotubes" include single-walled carbon nanotubes where (n−m)/3 is not an integer.

Some embodiments herein are directed to methods of separating semiconducting SWNTs (single-walled carbon nanotubes) from metallic SWNTs. Beneficially, the disclosed processes may be scaled and used in a bulk separation process. In addition, the processes may be carried out using inexpensive and readily available agents and may achieve high selectivity for each species of SWNTs. Accordingly, the present methods will find extensive application in all areas which use SWNT technology including, without limitation, field-effect transistors (FETs), sensors, light emitters, logic circuits, nanoelectronics, and sensor technologies.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

For the purposes of the present disclosure, as used herein, the term "separation agent" refers to any water-soluble molecular material that preferentially associates with the semiconducting species of SWNT and renders the resultant complex water soluble. Any separation agent that includes both the necessary geometry and the necessary electrical characteristics may be used in the disclosed process.

In general, in some embodiments herein, the present disclosure is believed to exploit the molecular charge transfer between SWNTs and an appropriate π-system to effectively separate metallic and semiconducting nanotubes. Furthermore, the present disclosure exploits the fact that carbon nanotubes, whether metallic or semi-conducting, are completely insoluble in an aqueous solution. Without wishing to be bound by theory, it is believed that the separation agent associates preferentially with only the semi-conducting type of SWNTs due to the differences in the electrical properties of the nanotubes and is believed to be non-covalently bound using a molecular charge transfer to the semi-conducting species, forming a water soluble complex. The complexed semiconductor SWNTs, therefore, go into solution, while the unbound metallic SWNTs remain insoluble and are readily separated as a precipitate.

The π-π interaction with the separation agent is believed to enable the solubilization of the bound species of SWNTs in the aqueous solution. Because of this non-covalent interaction, the complex may easily be disassociated into the separation agent and the semiconducting SWNTs, both of which may be recycled and reused. Thus, separation of the species is readily achieved.

The disclosed separation process may be used with any sized sample of SWNTs formed according to any known process. Common processes for forming SWNTs include, without limitation, dual laser methods, chemical vapor deposition (CVD) methods, carbon-arc methods, and HiPco methods, all of which are generally known to those of ordinary skill in the art and any of which may be suitable for forming samples containing SWNTs including both metllic and semiconducting species and capable of separation according to the disclosed process.

Some embodiments include a method for separating a sample of SWNTs containing an admixture of both metallic and semiconducting SWNTs. In the presently disclosed process, and while not wishing to be bound by any particular theory, it is believed that the differences in the surface electrical characteristics between the metallic and semiconducting SWNTs provide for the selectivity of the separation agents used and thus facilitate the separation processes herein disclosed.

Generally, the method of separating single-walled carbon nanotubes, includes providing carbon nanotubes including an admixture of semiconducting single-walled carbon nanotubes and metallic single-walled carbon nanotubes, and combining the admixture with a water-soluble separation agent in an aqueous solution, wherein the water-soluble separation agent comprises a planar portion, at least one π electron on the planar portion and at least one electron withdrawing group. The combination results in the formation of a water-soluble complex having semi-conducting SWNTs and the separation agent, and a precipitate having non-soluble metallic SWNTs. In some embodiments, the metallic SWNT precipitate is separated by suitable means, e.g. filtration. Further separation of the semi-conducting SWNTs may be achieved by reversing the association in the complexed SWNTs.

In some embodiments, the admixture of metallic and semi-conducting SWNTs to be separated may be preprocessed prior to contact with the separation agent. Preprocessing may, for example, be used to increase the efficiency of the disclosed process. In some embodiments, the sample may be preprocessed to remove extraneous materials prior to contact with the separation agent. For example, in one embodiment, the sample may be annealed to remove materials such as residual formation metals from the sample. Other pre-separation processes may optionally be used, and in general may vary depending upon the nature of the materials to be removed from the mixture. For example, other methods may include other purification processes as are generally known in the art that may remove an undesired material without destroying the SWNTs in the sample. Methods including, for example, oxidative acid treatment, cross-flow filtration, and functionalization-defunctionalization processes may be used. Such methods are generally known to those of ordinary skill in the art and may vary greatly depending upon the nature of the materials to be removed from the mixture. Thus, particular methods are not described in detail herein.

Some embodiments herein may be directed to a method of separating single-walled carbon nanotubes including providing carbon nanotubes having an admixture of semiconducting single-walled carbon nanotubes and metallic single-walled carbon nanotubes; and combining the admixture with a water-soluble separation agent in an aqueous solution to form a mixture, in which the water-soluble separation agent includes a planar portion, at least one π electron on the planar portion and at least one electron withdrawing group. In some embodiments, the aqueous solution may be free of any organic solvents. In some embodiments, the aqueous solution may be a mixture of water and a miscible cosolvent, such as, without limitation, a water-methanol mixture or a water-ethanol mixture.

In some embodiments, the separation agent may be present in an amount of about 0.025 mM separation agent per mg of SWNTs (mM SA/mg SWNTs) to about 0.25 mM SA/mg SWNTs. In some embodiments, the separation agent may be present in an amount of about 0.025 mM SA/mg SWNTs to about 0.20 mM SA/mg SWNTs, about 0.025 mM SA/mg SWNTs to about 0.15 mM SA/mg SWNTs, about 0.025 mM SA/mg SWNTs to about 0.10 mM SA/mg SWNTs, about 0.025 mM SA/mg SWNTs to about 0.05 mM SA/mg SWNTs, about 0.03 mM SA/mg SWNTs to about 0.25 mM SA/mg SWNTs, about 0.03 mM SA/mg SWNTs to about 0.20 mM SA/mg SWNTs, about 0.03 mM SA/mg SWNTs to about 0.1 mM SA/mg SWNTs, about 0.03 mM SA/mg SWNTs to about 0.05 mM SA/mg SWNTs, about 0.04 mM SA/mg SWNTs to about 0.25 mM SA/mg SWNTs, about 0.04 mM SA/mg SWNTs to about 0.20 mM SA/mg SWNTs, about 0.04 mM SA/mg SWNTs to about 0.15 mM SA/mg SWNTs, about 0.04 mM SA/mg SWNTs to about 0.10 mM SA/mg SWNTs, about 0.04 mM SA/mg SWNTs to about 0.05 mM SA/mg SWNTs, about 0.025 mM SA/mg SWNTs, about 0.03 mM SA/mg SWNTs, about 0.04 mM SA/mg SWNTs, about 0.05 mM SA/mg SWNTs, about 0.1 mM SA/mg SWNTs, or ranges between any two of these values. For example, about 5 mL of a 5 mM separation agent may be combined with about 1 mg of SWNTs in an aqueous solution or about 5 mL of a 10 mM separation agent may be combined with about 1 mg of SWNTs in an aqueous solution. In some embodiments, the separation agent may be present in an amount sufficient to form the complex described herein with at least about 50% of the semiconducting nanotubes. In other embodiments, the separation agent may be present in an amount sufficient to form the complex described herein with at least about 60%, about 70%, about 80%, about 90%, about 95%, about 99%, about 99.5%, about 99.9%, or about 100% of the semiconducting nanotubes.

In some embodiments, the mixture may be further heated to a temperature of about 30° C. to about 100° C. In other embodiments, the mixture may be further heated to a temperature of about 30° C. to about 90° C., about 30° C. to about 80° C., about 30° C. to about 70° C., about 40° C. to about 100° C., about 40° C. to about 80° C., about 40° C. to about 70° C., about 40° C. to about 70° C., about 50° C. to about 100° C., about 50° C. to about 80° C., about 50° C. to about 70° C., about 50° C. to about 70° C., or a combination thereof. Specific examples of temperatures include about 30° C., about 40° C., about 50° C., about 60° C., about 70° C., about 80° C., about 90° C., about 100° C., and ranges between any two of these values. In some embodiments, the mixture may be heated for about 5 hours to about 48 hours, about 5 hours to about 36 hours, about 5 hours to about 24 hours, about 10 hours to about 48 hours, about 10 hours to about 36 hours, about 10 hours to about 24 hours, about 15 hours to about 48 hours, about 15 hours to about 36 hours, about 5 hours to about 24 hours, about 20 hours to about 48 hours, about 20 hours to about 36 hours, about 20 hours to about 24 hours, at least about 20 hours, or at least about 24 hours. Specific examples of times include about 5 hours, about 10 hours, about 12 hours, about 18 hours, about 24 hours, about 36 hours, about 42 hours, about 48 hours, or ranges between any two of these values.

In some embodiments, the mixture may be sonicated prior to heating. In some embodiments, the mixture may be sonicated for about 1 to about 20 hours. In some embodiments, the mixture may be sonicated for about 1 to about 15 hours, about 1 to about 10 hours, about 1 to about 8 hours, about 1 to about 6 hours, about 1 to about 5 hours, about 1 to about 4 hours, about 2 to about 15 hours, about 2 to about 10 hours, about 2 to about 8 hours, about 2 to about 6 hours, about 2 to about 5 hours, about 2 to about 4 hours, about 3 hours, about 4 hours, or about 5 hours. Specific examples of times include about 1 hour, about 2 hours, about 3 hours, about 4 hours, about 5 hours, about 6 hours, about 8 hours, about 10 hours, about 12 hours, about 14 hours, about 16 hours, about 18 hours, about 20 hours, or ranges between any two of these values. In some embodiments, the mixture may be sonicated at a temperature of about 30° C. to about 100° C. In other embodiments, the mixture may be sonicated at a temperature of about 30° C. to about 90° C., about 30° C. to about 80° C., about 30° C. to about 70° C., about 40° C. to about 100° C., about 40° C. to about 80° C., about 40° C. to about 70° C., about 40° C. to about 70° C., about 50° C. to about 100° C., about 50° C. to about 80° C., about 50° C. to about 70° C., about 50° C. to about 70° C., or a combination thereof. Specific examples of temperatures include about 30° C., about 40° C., about 50° C., about 60° C., about 70° C., about 80° C., about 90° C., about 100° C., and ranges between any two of these values.

In some embodiments, the separation agent selectively associates with the semiconducting single-walled carbon nanotubes in the admixture to form a water soluble complex. In some embodiments, the complex may be a charge-transfer complex. In some embodiments, the association between the separation agent and the semiconducting single-walled carbon nanotubes may be reversed to form dissociated semiconducting single-walled carbon nanotubes. In some embodiments, the dissociated semiconducting single-walled carbon nanotubes are insoluble in water. In some embodiments, the association step may be reversed by adding sufficient water to the aqueous solution to weaken the association between the semiconducting single-walled carbon nanotubes and the separation agent. In other embodiments, the association may be reversed by evaporating water from the aqueous solution and washing the complex with water to disassociate the semiconducting single-walled carbon nanotubes from the separation agent.

Some embodiments herein may be directed to a method of separating single-walled carbon nanotubes including attaching the separation agent to a stationary phase to make an affinity purification column. In some embodiments, the SWNTs are non-covalently attached to the stationary phase. In some embodiments, the method further includes adding SWNTs to the column. In some embodiments, the method further includes collecting the metallic SWNTs as it flows through the column without binding the separation agent. In some embodiments, the semiconducting SWNTs may be bound to the separation agent in the column and may be retained in the column. In some embodiments, the method further includes eluting the semiconducting SWNTs by adding water or water mixed with a miscible co-solvent, such as without limitation, methanol, ethanol or a combination thereof. In other embodiments, the semiconducting SWNTs may be eluted by adding a competitor of the semiconducting SWNTs. In some embodiments, the stationary phase may be silica.

In some embodiments, the separation agent may be water-soluble and may include materials that associate preferentially with semiconducting SWNTs. The preferential association exhibited by the disclosed separation agents is believed to be due to a combination of the particular geometries of the agents with the orbital characteristics of the agents. More specifically, in some embodiments, the separation agent may exhibit a planar geometry over at least a portion of the molecule. In addition, the separation agent may include π-electrons in the planar portion of the molecule. Thus, in some embodiments, the π electrons may be physically available for association with the surface of a semiconducting SWNT. The separation agent also includes at least one electron withdrawing group. The electron withdrawing groups may be arranged in pairs preferably placed symmetrically around the separation agent.

While not wishing to be bound by theory, it is believed that the separation agents of the disclosed processes preferentially associate with semiconducting SWNTs due to a molecular charge transfer on the surface of the semiconducting SWNTs. More specifically, due to the planar orientation of the separation agent molecule and the nature of the π electrons in that portion of the molecule, the π electrons may be available for interaction with an existing charge. Semiconducting SWNTs also carry a slight charge on their surface. Metallic SWNTs, on the other hand, will not hold such a static charge, due to their electronic nature. Thus, the separation agent may be electronically attracted to the semiconducting nanotubes and moreover, following initial attraction, a weak electronic bond may form through molecular charge transfer between the planar portion of the agent and the surface of the semiconducting nanotubes that can hold the agent on the surface of the semiconducting SWNTs forming a complex. It is further believed that this charge transfer interaction enables the complex to be soluble in an aqueous medium.

In addition to the combination of geometric and orbital characteristics that enables the agents to preferentially associate with the semiconducting SWNTs over the metallic SWNTs, the disclosed separation agents should also be water-soluble. For example, in some embodiments, the separation agent of choice may be derivatized to include electron withdrawing groups to make it more water-soluble. In one particular embodiment, a separation agent may be derivatized to include one or more electron withdrawing groups so as to promote solubility of the agent in an aqueous medium.

In some embodiments, the water-soluble separation agent includes a planar portion, at least one π electron on the planar portion and at least one electron withdrawing group. In some embodiments, the planar body may include about 1 to about 46 pi electrons, about 1 to about 40 pi electrons, about 1 to about 30 pi electrons, about 1 to about 26 pi electrons, about 2 to about 46 pi electrons, about 2 to about 40 pi electrons, about 2 to about 30 pi electrons, about 2 to about 26 pi electrons, about 4 to about 46 pi electrons, about 4 to about 40 pi electrons, about 4 to about 30 pi electrons, about 4 to about 26 pi electrons, about 6 to about 46 pi electrons, about 6 to about 40 pi electrons, about 6 to about 30 pi electrons, about 6 to about 26 pi electrons, or ranges between any two of these values. Specific examples of the number of pi electrons may include, without limitation, 6 pi electrons, 8 pi electrons, 10 pi electrons, 12 pi electrons, 14 pi electrons, 16 pi electrons, 18 pi electrons, 20 pi electrons, 22 pi electrons, 24 pi electrons, 26 pi electrons or ranges between any two of these values. In some embodiments, the planar body may include at least 6 pi electrons.

In some embodiments, the separation agent may have a π skeleton attached to at least one electron-withdrawing group (EWG). In some embodiments, the energy gap of the polyaromatic hydrocarbon may match the energy gap of the SWNTs. In some embodiments, the water-soluble separation agent may be a poly-aromatic hydrocarbon substituted with at least one electron withdrawing group, or a salt thereof, generally having the formula:

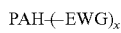

and salts thereof, wherein PAH is a poly-aromatic hydrocarbon, EWG is an electron withdrawing group, and X is 1 or more up to the maximum number of available binding sites on the PAH. X can be an even or odd number, with EWGs arranged as symmetrical pairs around the PAH. The EWGs can alternatively be arranged in an asymmetrical manner around the PAH.

In some embodiments, the poly-aromatic hydrocarbon may be selected from azulene, naphthalene, 1-methylnaphthalene, acenaphthene, acenaphthylene, anthracene, fluorine, phenalene, phenanthrene, benz[a]anthracene, benzo[a]fluorine, benzo[c]phenanthrene, chrysene, bluoranthene, pyrene, tetracene, triphenylene, benzopyrene, benzo[a]pyrene, benzo[e]pyrene, benzo[a]fluoranthene, benzo[b]fluoranthene, benzo[j]fluoranthene, benzo[k]fluoranthene, dibenz[a,h]anthracene, dibenz[a,j]anthracene, pentacene, perylene, picene, tetraphenylene, anthanthrene, benzo[ghi]perylene, corannulene, coronene, dicoronylene, diindenoperylene, helicene, heptacene, hexacene, kekulene, ovalene, or zethrene, a salt thereof, an analog thereof, a derivative thereof or a combination thereof. In further embodiments, the poly-aromatic hydrocarbon may be selected from coronene, perylene, pyrene, fluoranthene, anthracene, acenaphthylene, acenaphthene, chrysene, phenanthrene, naphthalene, corannulene, triphenylene, ovalene, tetracene, pentacene, a salt thereof, an analog thereof, a derivative thereof or a combination thereof. In some embodiments, the poly-aromatic hydrocarbon is selected from coronene, perylene, naphthalene, chrysene, pyrene or a salt thereof. In some embodiments, the poly-aromatic hydrocarbon is coronene. In some embodiments, the separation agent may include, for example, coronene tetracarboxylic acid, coronene octacarboxylic acid, perylene disulfonic acid, perylene tetracarboxylic acid, perylene tetracarboxylic ammonium, naphthalene tetracarboxylic acid, coronene tetrasulfonic acid, pyrene dicarboxylic acid, pyrene disulfonic acid, chrysene dicarboxylic acid, and chrysene disulfonic acid, or salts thereof. In some embodiments, the poly-aromatic hydrocarbon salt is a monocationic metal. In some embodiments, the poly-aromatic hydrocarbon is a poly-aromatic hydrocarbon salt selected from potassium, sodium, lithium, or a combination thereof.

For example, in some embodiments, the separation agent may be a coronene substituted with 1-12 electron withdrawing groups or salt thereof, in accordance with the formula:

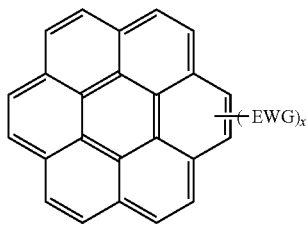

wherein EWG is an electron withdrawing group and x is 1 to 12. In some cases, x is 1-12, 1-8, or 2-8. Specific examples of x include 1, 2, 3, 4, 5, 6, 7, 8, 9, 10, 11, or 12. In some embodiments, x is 4, and the EWGs are arranged in symmetrical pairs around the coronene. In some embodiments, x is 4, or x is 8 and the EWGs are arranged in symmetrical pairs around the coronene. For example:

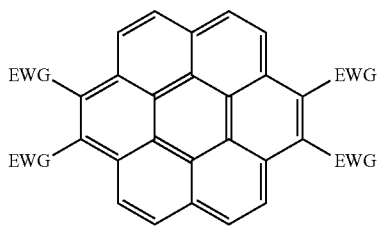

In some such embodiments, the EWG is carboxylic acid ($CO_2H$). In further embodiments, the separation agent includes a potassium salt of coronene-1,2,7,8-tetracarboxylic acid.

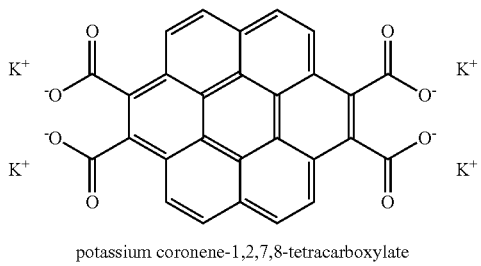

potassium coronene-1,2,7,8-tetracarboxylate

In further embodiments, the separation agent includes a potassium salt of coronene-1,2,4,5,7,8,10,11-octacarboxylic acid.

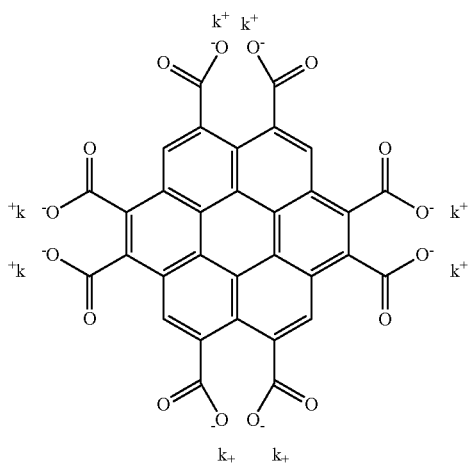

In some embodiments, the separation agent may include at least 2 electron withdrawing groups attached to the planar portion. In other embodiments, the separation agent may include at least 4 electron withdrawing groups, at least 6 electron withdrawing groups, or at least 8 electron withdrawing groups. In some embodiments, the separating agent may include the maximum number of electron withdrawing groups possible on the planar portion. For example, naphthalene can have up to 8 EWGs, perylene can have up to 12 EWGs, and anthracene can have up to 10 EWGs. In some embodiments, the separating agent may include enough electron-withdrawing groups to make the separation agent water-soluble. In some embodiments, the separating agent may include enough electron-withdrawing groups to make the separation agent water-soluble and to attain highly selective binding. In some embodiments, the electron withdrawing groups are located symmetrically around the planar portion. Methods for such derivatizations are generally well known to those of ordinary skill in the art, and thus are not discussed in detail herein. Many such derivatives are commercially available. In other embodiments, however, the agent may be naturally water-soluble, and thus a separate derivatization process need not be carried out to provide the desired solubility to the agent. The characteristic of water solubility as part of the separation agent may provide for a relatively simple method for the separation of the semiconducting SWNTs from the metallic SWNTs following the preferential association of the agent with the semiconducting SWNTs, in particular, as metallic SWNTs are not water-soluble materials.

The term "electron-withdrawing group" is recognized in the art and denotes the tendency of a substituent to attract valence electrons from neighboring atoms, i.e., the substituent is electronegative with respect to neighboring atoms. A quantification of the level of electron-withdrawing capability is given by the Hammett sigma ($\sigma$) constant (see, e.g., J. March, Advanced Organic Chemistry, McGraw Hill Book Company, New York, (1977 edition) pp. 251-259). The Hammett constant values are generally negative for electron donating groups and positive for electron withdrawing groups. For example the Hammet constant for para substituted electron donating $NH_2$ ($\sigma[P]$) is about $-0.7$ and the $\sigma[P]$ for an electron withdrawing nitro group is about $+0.8$.

Electron-withdrawing groups may include, but are not limited to, aldehyde (—COH), acyl (—COR), carbonyl (—CO), carboxylic acid (—COOH), ester (—COOR), halide (e.g. —F, —Br, —I, —At), fluoromethyl (—$CH_{(3-n)}F_n$), particularly trifluoromethyl, cyano (—CN), sulfonyl (—$SO_n$), sulfone (—$SO_2R$), sulfonic acid (—$SO_3H$), primary ammonium (—$NH_2R^+$), secondary ammonium (—$NHR_2^+$), tertiary ammonium (—$NR_3^+$), nitro (—$NO_2$) or a combination thereof, in which each R is independently H, or $C_1$ to $C_6$ alkyl; and n is 1, 2 or 3. In some embodiments, the electron withdrawing group may be a strong electron withdrawing group having a $\sigma$ of at least about 0.2, and in some embodiments, the electron withdrawing group may form a dipole. In some embodiments, the electron withdrawing group may be selected from —COR, —CO, —COOR, —F, —Cl, —Br, —I, —At, —$CH_{(3-n)}F_n$, —CN, —$SO_2R$, —$SO_3H$, —$NH_{(3-n)}R_n^+$, —$NO_2$ and a combination thereof, in which each R is independently H, or $C_1$ to $C_6$ alkyl; and n is 1, 2, or 3. In some embodiments, the electron withdrawing group may be anionic or cationic. For example, in particular embodiments, the electron withdrawing group may be a carboxyl, ammonium, or sulfonyl. In some embodiments, the electron withdrawing group may be selected from —$COO^-$, —$SO_3^-$, —$NH_{(3-n)}R_n^+$ and a combination thereof, in which each R is independently H, or $C_1$ to $C_6$ alkyl; and n is 1, 2, or 3.

In some embodiments, the separation agent may further comprise a linking group between an electron withdrawing group and the planar portion. In some embodiments, the linking group is a glycol linker. In some embodiments, the linking group may comprise from about 1 to about 15 carbons. In other embodiments, the linking group may comprise from about 1 to about 9 carbons. In some embodiments, the linking group may be ethylene glycol, 1,3-propanediol, 1,4-butanediol, 1,5-pentanediol, 1,8-octanediol, 1,2-propanediol, 1,2-butanediol, 2,3-butanediol, 1,3-butanediol, 1,2-pentanediol, etohexadiol, p-menthane-3,8-diol, 2-methyl-2,4-pentanediol, and the like or a combination thereof. In some embodiments, the linking group may be methylene, dimethylene, trimethylene, tetramethylene, and the like. In some embodiments, the linking group may comprise esters; ethers; thio-ethers; amides; ketones; urethanes or a combination thereof.

Following solubilization via a non-covalent solubilization process, the aqueous solution that is enriched in semiconducting SWNTs complexed with the separation agent may be separated from the insoluble metallic SWNTs by any suitable method. For example, in one embodiment, the insoluble metallic SWNTs precipitate out of solution and the precipitate that is enriched in metallic SWNTs may be collected while the solution that is enriched in the complexed semiconducting SWNTs may be collected separately. In some embodiments, the metallic single-walled carbon nanotubes may precipitate from the aqueous solution. Some embodiments include further purifying the precipitate.

In some embodiments, the precipitate collected from a single protocol as described above may be enriched in metallic SWNTs as compared to the starting sample. In some embodiments, the precipitate obtained from a single separation protocol as described above may be at least about 50% metallic SWNTs by weight. In some embodiments, the precipitate obtained from a single separation protocol as described above may be at least about 60%, at least about 70%, at least about 80%, at least about 90%, at least about 95%, at least about 99%, at least about 99.5%, at least about 99.7% or at least about 99.9% metallic SWNTs by weight. In some embodiments, the precipitate obtained from a single separation protocol as described above may be about 100% metallic SWNTs by weight.

In one embodiment, if desired, the separation process may be repeated on the collected precipitate and the sample including an enriched concentration of metallic SWNT may be further purified. In some embodiments, each repetition of the process results in the separation of more metallic SWNTs from the original sample. In some embodiments, repetition of the process results in the separation of at least about 90%, at least about 95%, at least about 99%, at least about 99.5%, at least about 99.7%, at least about 99.9% or about 100% of all metallic carbon nanotubes present in the original sample. In some embodiments, repetition of the process two to four times may provide a metallic-enriched SWNT sample that is at least about 90%, at least about 95%, at least about 99%, at least about 99.5%, at least about 99.7% or at least about 99.9% metallic SWNTs by weight. In one embodiment, repetition of the process two to four times may provide a metallic-enriched SWNT sample that is about 100% metallic SWNTs by weight.

Embodiments herein also provide for a composition including a complex having a water-soluble separation agent including a planar portion, at least one π electron on the planar portion and at least one electron withdrawing group; and a semiconducting single-walled carbon nanotube in an aqueous solution. As described above, in some embodiments, the complex formed may be a charge-transfer complex. In some embodiments, the complex may be soluble in the aqueous solution. In some embodiments, the complex may be dissolved in the aqueous solution. In some embodiments, the aqueous solution further includes a water-insoluble metallic single-walled carbon nanotube.

According to one embodiment, the aqueous solution including the semiconducting nanotubes complexed with the separation agent may be further processed, if desired, for instance to reverse the association and recover the pure semiconducting SWNTs. Beneficially, as the association between the separation agents and the semiconducting SWNTs is believed to be non-covalent in nature, any of a number of relatively simple separation processes as are generally known in the art may be used to reverse the association and render the semiconducting SWNTs insoluble again, at which point they may be collected as a solid residue or precipitate. For example, in one embodiment, following separation from the precipitate enriched in metallic SWNTs, the separation agent may be removed from the semiconducting SWNTs by diluting the aqueous solution. It is believed that adding sufficient water to weaken the bonds between the separation agent and the semiconducting SWNTs will reverse the association between the separation agent and the semiconducting SWNTs. In another embodiment, the aqueous solvent may be evaporated, and the separation agent may be removed from the SWNTs by washing with water or an acid, for example, acetic acid. In an embodiment, following reversal of the association, the semiconducting SWNTs become insoluble, and the solid residue including the semiconducting SWNTs may be collected.

In some embodiments, the solid residue collected from a single protocol to reverse the association as described above may be enriched in semiconducting SWNTs as compared to the starting sample. In some embodiments, the solid residue obtained from a single protocol to reverse the association as described above may be at least about 50% semiconducting SWNTs by weight. In some embodiments, the solid residue obtained from a single protocol to reverse the association as described above may be at least about 60%, at least about 70%, at least about 80%, at least about 90%, at least about 95%, at least about 99%, at least about 99.5%, at least about 99.7% or at least about 99.9% semiconducting SWNTs by weight. In some embodiments, the solid residue obtained from a single protocol to reverse the association as described above may be about 100% semiconducting SWNTs by weight.

If desired, the solid material enriched in semiconducting SWNTs may be further enriched by repetition of the separation process, similar to the further enrichment of the metallic SWNT sample described above. In some embodiments, each repetition of the process results in the separation of more semiconducting SWNTs from the original sample. In some embodiments, repetition of the process results in the separation of at least about 90%, at least about 95%, at least about 99%, at least about 99.5%, at least about 99.7%, at least about 99.9% or at least about 100% of all semiconducting carbon nanotubes present in the original sample. In some embodiments, repetition of the separation process two to four times may provide a SWNT sample enriched in semiconducting nanotubes having at least about 90%, at least about 95%, at least about 99%, at least about 99.5%, at least about 99.7% or at least about 99.9% semiconducting SWNTs by weight. In some embodiments, repetition of the separation process two to four times may provide a SWNT sample enriched in semiconducting nanotubes having about 100% semiconducting SWNTs by weight. In some embodiments, separation may vary depending on the concentration of the separation agent and the time of interaction.

As an additional benefit to the disclosed process, the separation agent may be recovered following reversal of the association with the semiconducting SWNTs and used multiple times. Thus, the disclosed separation process may be simple, economical, and may provide a method to obtain both highly enriched metallic SWNT samples and highly enriched semiconducting SWNT samples in both small-scale and large-scale systems.

In the present disclosure, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be used, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 substituents refers to groups having 1, 2, or 3 substituents. Similarly, a group having 1-5 substituents refers to groups having 1, 2, 3, 4, or 5 substituents, and so forth.

EXAMPLE 1

SWNT Separation Via a Potassium Salt of Coronene Tetracarboxylic Acid

A separation agent, the potassium salt of coronene tetracarboxylic acid, was prepared starting from perylene by oxidative benzogenic Diels-Alder reaction with N-ethyl maleimide followed by hydrolysis of the resulting diimide with KOH in methanol. In a typical experimental procedure perylene (6.0 g, 24 mmol), N-ethyl-maleimide (37.5 g, 300 mmol), p-hydroxyanisole (1.5 g, 12 mmol) and chloranil (22.5 g, 91 mmol) were thoroughly mixed and heated with stirring to reflux (oil bath at 240° C.) for 6 h. To the resulting highly viscous mixture at 240° C. DMF (50 mL) was added cautiously through the reflux condenser and the reflux was continued until the mixture became fluid again. The mixture was then vacuum-filtered to yield 5.9 g (50%) of a yellow powder. The powder was transferred to a 100 mL flask, methanol (60 mL) and potassium hydroxide (40 g) were added and the mixture was heated with stirring to boiling temperature. The methanol was left to boil off till 60 mL of a transparent brownish solution remained in the flask. Reflux was continued overnight at about 130° C. (oil bath at 150° C.) for 12 h. After reflux, the reaction mixture was cooled to room temperature and water was added to make a clear solution. The product was then precipitated out by the addition of acetone. The charge-transfer (CT) bands were determined with UV-Vis Spectroscopy. CT bands are additional bands that appear in the spectrum when slat is interacted with SWNT or graphene. The separation agent, which is soluble in water, displayed a CT band with graphene around 460 nm and around 510 nm with SWNTs. SWNTs were prepared by the arc-discharge method and purified by interaction with hydrogen and acid treatment according to established procedure. (Vivekchand, S. R. C. et al., *Small* 2005, I, 920).

METHODS: One mg of purified SWNTs was taken up in 5 mL of a 5 mM or 10 mM solution of the separation agent in water and the mixture was sonicated at 50° C. for 3 hours, followed by heating at 70° C. for 12 hours. The resulting mixture was set aside for 24 hours when a precipitate appeared at the bottom of the container. Keeping the reaction mixture for longer periods (48 hours) resulted in the precipitation of some semiconducting nanotubes. Adsorbed separation agent was removed from the nanotubes by extensive washing with water (FIG. 1).

The precipitate as well as the solid extracted from the solution were examined by electron absorption spectroscopy and Raman spectroscopy. Scanning electron microscopy images were obtained by field-emission scanning electron microscope (FESEM, PEI Nova-Nano SEM-600, Netherlands). Optical absorption spectra were recorded with Perkin-Elmer UV/VIS/NIR spectrometer on solid samples of SWNTs deposited on quartz plate. Raman spectra were recorded with LabRAM HR high resolution Raman spectrometer (Horiba Jobin Yvon) using a He—Ne Laser ($\lambda$=632.8 nm). For RAMAN measurements, SWNT samples were filtered through PTFE membrane and thoroughly washed with water to remove the separation agent. I-V measurements were measured by two-point probe method between two gold electrodes having a probe separation of 20 μm using Keithley 236 multimeter.

Figure 2:
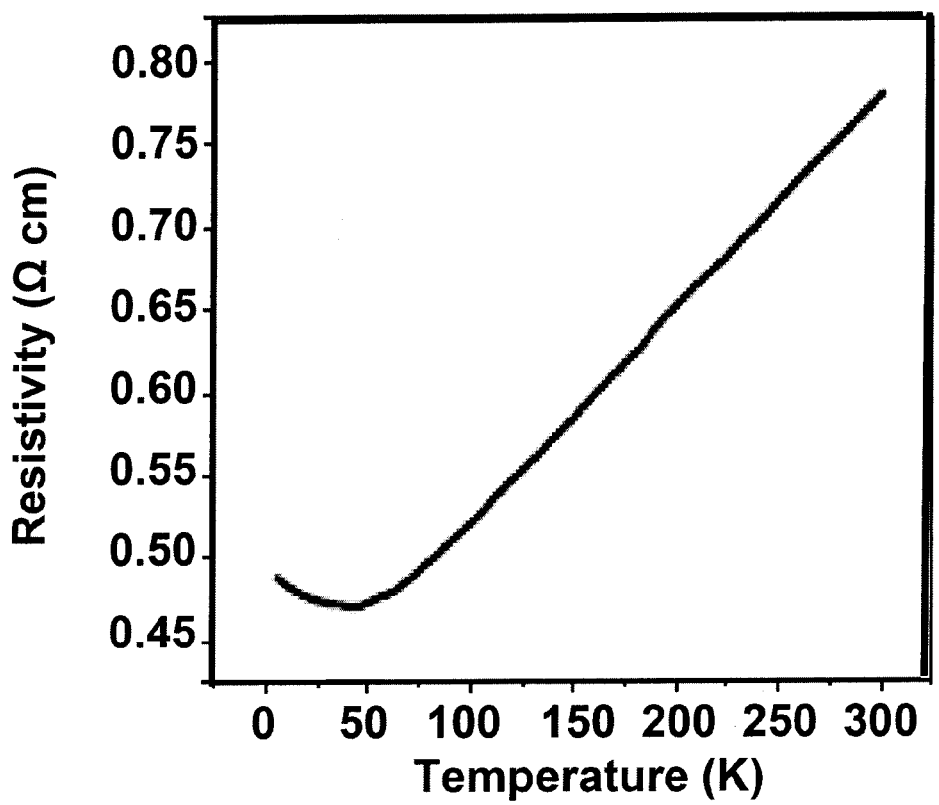
FIG. 2 is a graph depicting the results of temperature dependent resistivity measurements of metallic single-walled carbon nanotubes obtained in accordance with an embodiment described herein.

RESULTS: In Raman studies, a 632 nm excitation caused resonation in roughly equal populations of both metallic and semiconducting tubes for the diameter range of the tubes used in this study (~1.2 to 1.8 nm), whereas the 514 nm laser excited semiconducting nanotubes exclusively. (Kataura, H. et al, *Synth. Met.* 1999, 203, 2555; Zheng, M. et al., *Science* 2003, 302, 1545). Temperature-dependent resistivity measurements were carried out by the standard four-probe method using the resistivity option in the Physical Property Measurement System (PPMS), Quantum Design, USA (FIG. 2).

Figure 3:
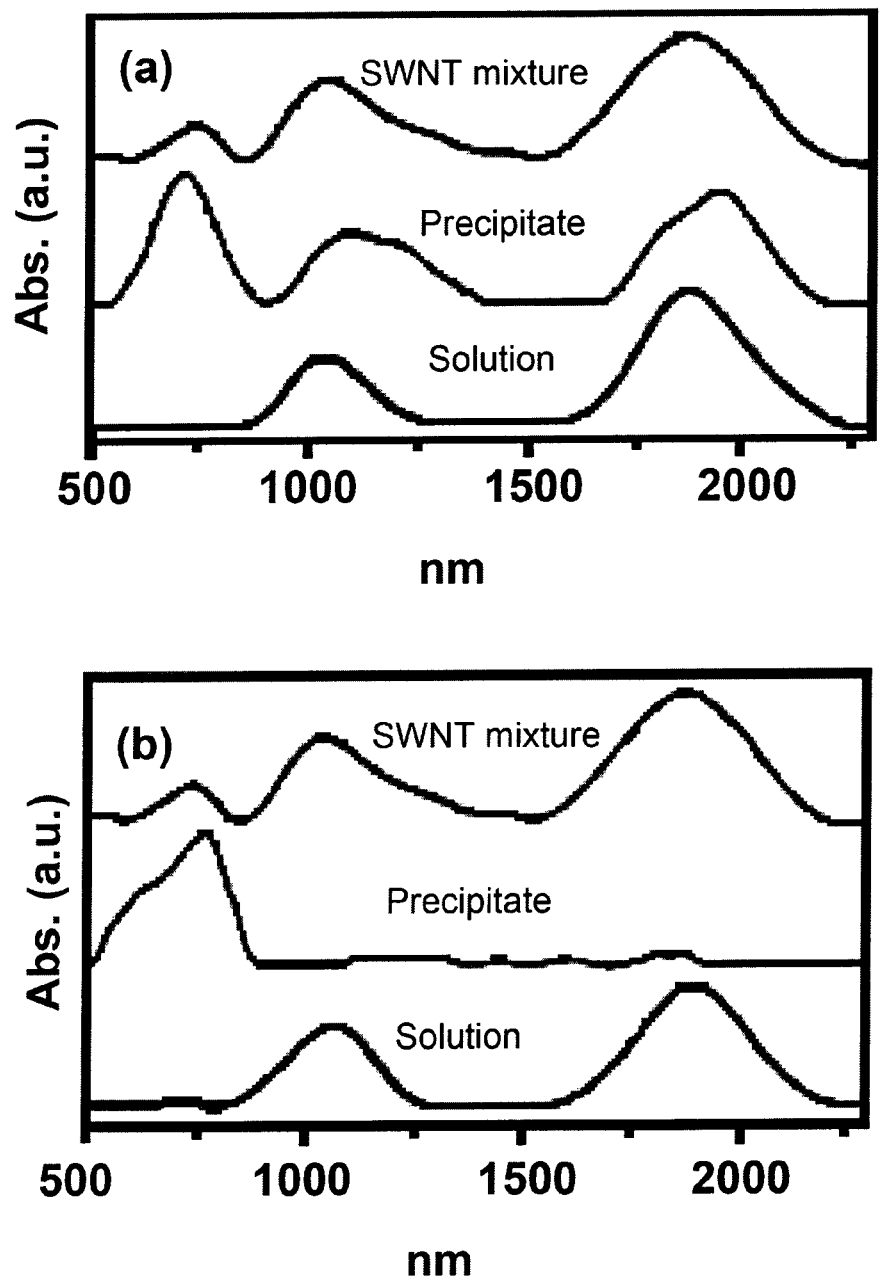
FIG. 3 is a graph depicting the optical absorption spectra of pristine single-walled carbon nanotubes, precipitate and single-walled carbon nanotubes from solution after background subtraction obtained in accordance with an embodiment described herein.
Figure 4:
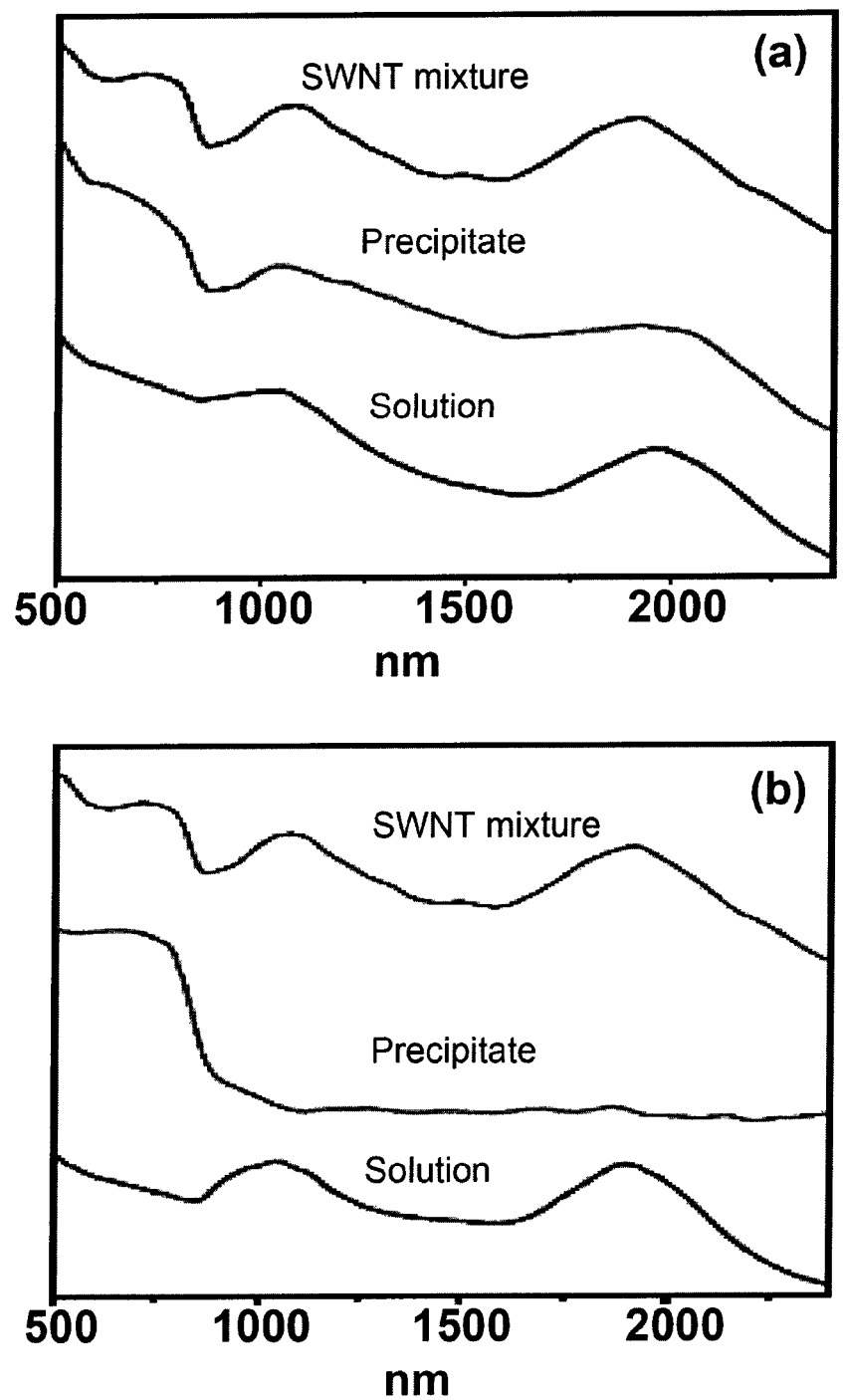
FIG. 4 is a graph the optical absorption spectra of pristine single-walled carbon nanotubes, precipitate and single-walled carbon nanotubes from solution obtained in accordance with an embodiment described herein.

In general, pristine SWNTs exhibit bands at around 750 nm corresponding to the metallic nanotubes and around 1040 nm and 1880 nm due to the semiconducting species due to Hove singularities in the optical absorption spectra (FIGS. 3 and 4). Spectra in FIG. 3 was obtained after background subtraction whereas spectra in FIG. 4 was obtained without background subtraction. SWNTs extracted from the solution exhibit only the 1040 nm and 1880 nm bands due to the semiconducting species (FIG. 3 and FIG. 4). SWNTs in the precipitate, however, exhibited bands due to both the metallic and semiconducting species when a 5 mM solution of the separation agent was used (FIG. 3A) but only the band due to the metallic species when a 10 mM solution of the separation agent was used (FIG. 3B). These results were supported by a MEM image of the metallic species after washing with water to remove the separation agent (FIG. 1). Thus, optical absorption spectra clearly demonstrated the separation of metallic and semiconducting SWNTs on interaction with the separation agent.

Figure 5:
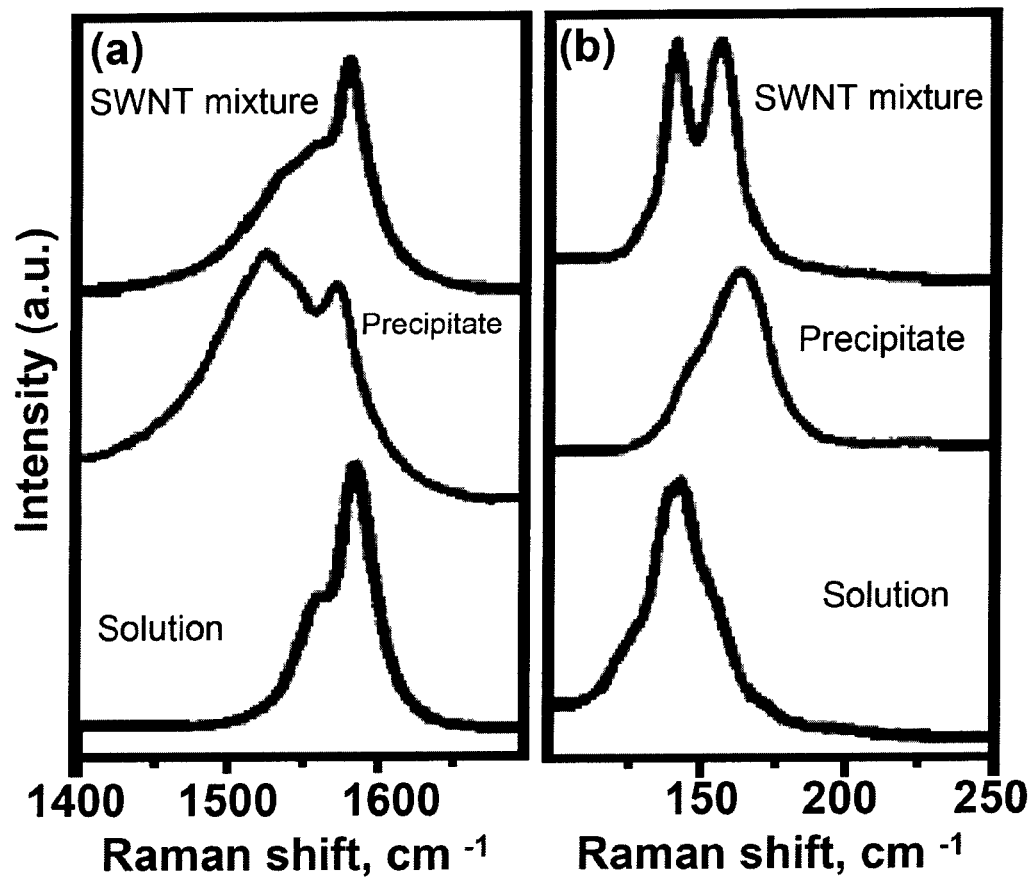
FIG. 5 is a graph depicting a raman (A) G-band and (B) radial breathing mode (RBM) obtained according to an embodiment described herein.

These results were supported by Raman spectra. Purified SWNT mixture exhibited Raman bands due to the radial breathing mode (RBM) in the Raman spectra in the 100-200 $cm^{-1}$ region and the G-band in the 1500-1600 $cm^{-1}$ (G-band) region. The G-band of the semiconducting tubes consisted of two features around 1570 $cm^{-1}$ (radial) and 1590 $cm^{-1}$ (longitudinal). The G-band of the metallic tubes showed bands around 1585 $cm^{-1}$ (radial) and 1540 $cm^{-1}$ (longitudinal), the latter broadened into a Breit-Wigner Fano (BWF) line shape due to strong coupling in the density of states. (Das, A. et al., *Phys. Rev. Len.* 2008, 99, 136803.) The 1540 $cm^{-1}$ feature is generally used as a signature of metallic SWNTs. SWNTs extracted from the 10 mM solution of the potassium salt of coronene tetracarboxylic acid exhibited features of the G-band corresponding to the semiconducting species, whereas the precipitate showed features of pure metallic species with the prominent feature around 1540 $cm^{-1}$ (FIG. 5A). Pristine SWNTs showed two RBM bands due to semiconducting and metallic species (FIG. 5B). SWNTs from the solution showed only the band due to the semiconducting species, and SWNTs in the precipitate correspond to the metallic species.

Figure 6:
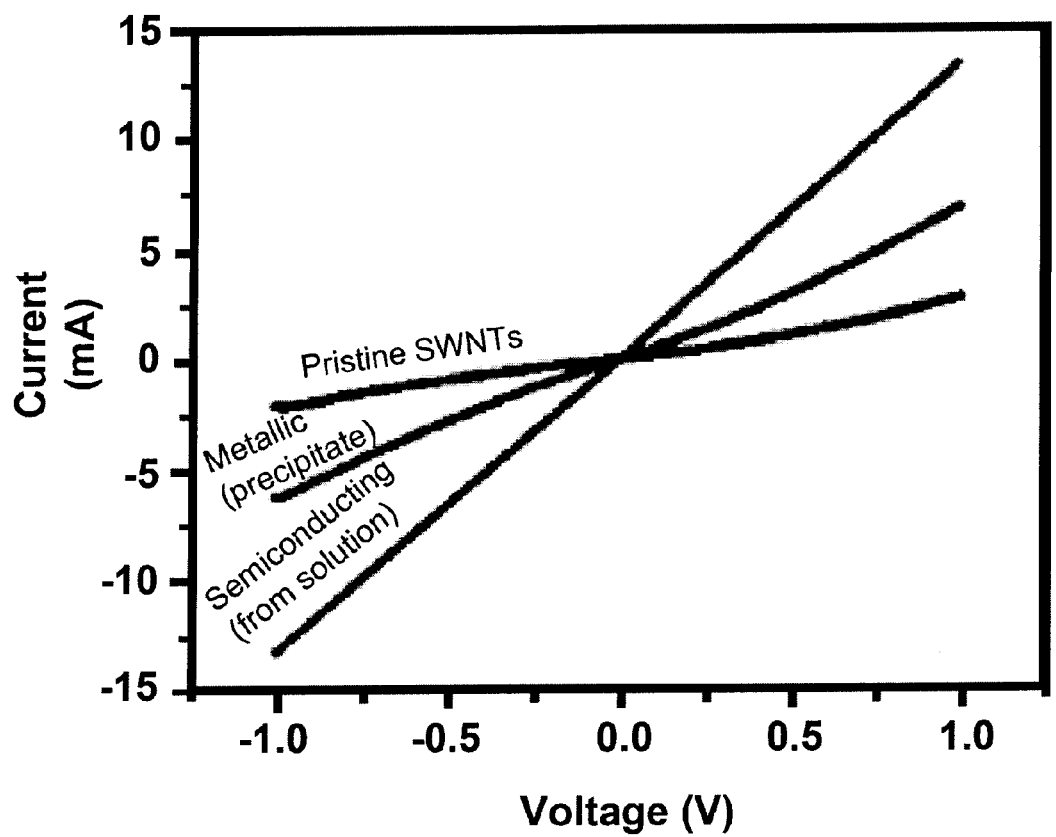
FIG. 6 is a graph depicting I-V measurements obtained according to an embodiment described herein.

The current-voltage (I-V) characteristics of SWNTs (measured by the two-point probe method between two gold electrodes) from the solution and precipitate were compared with those of the pristine nanotubes. Pristine SWNTs showed a nonlinear I-V curve while the metallic nanotubes show linear behavior with conductivities of 92.5 and 1538.5 mS/cm respectively at 300 K. The latter value is comparable to that in the literature. Semiconducting nanotubes exhibited a low conductivity of 53.5 mS/cm and a nonlinear I-V curve (FIG. 6). These results were in accord with the spectroscopic data.

Figure 7:
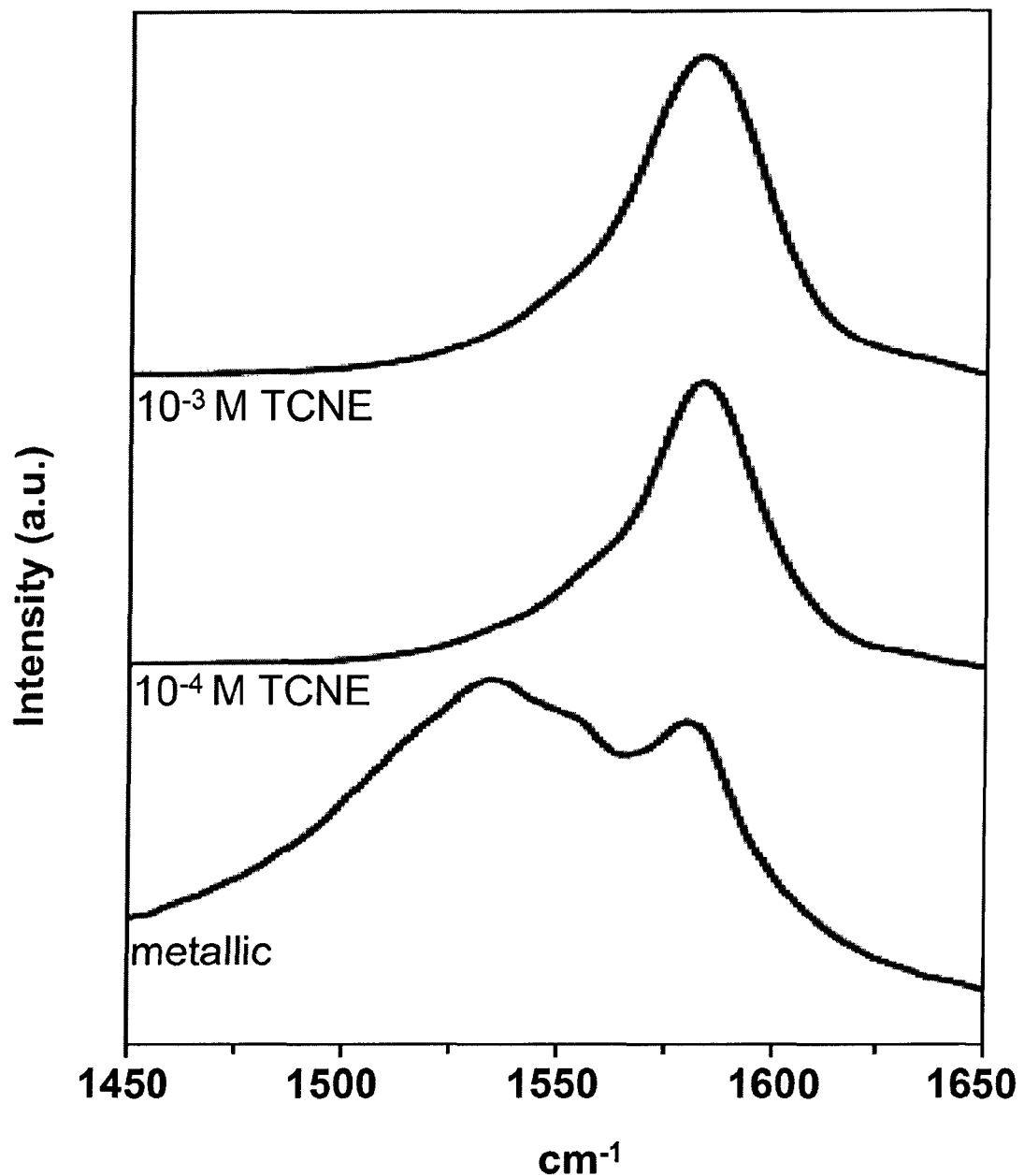
FIG. 7 is a graph depicting changes in the G-band of metallic SWNTs on interaction with varying concentrations of an electron acceptor molecule, tetracyanoethylene (TCNE), obtained according to an embodiment described herein.

Having obtained pure semiconducting and metallic SWNTs, their interaction with electron donor and acceptor molecules was observed. Upon interaction with an electron acceptor molecule, tetracyanoethylene (TCNE), the 1540 $cm^{-1}$ feature in Raman spectra due to metallic species disappeared (FIG. 7). This may be due to a change in the Fermi level of the nanotubes. Electron-donating molecules such as tetrathiafulvalene (TTF) had no effect on the Raman spectrum of metallic SWNTs.

Figure 8:
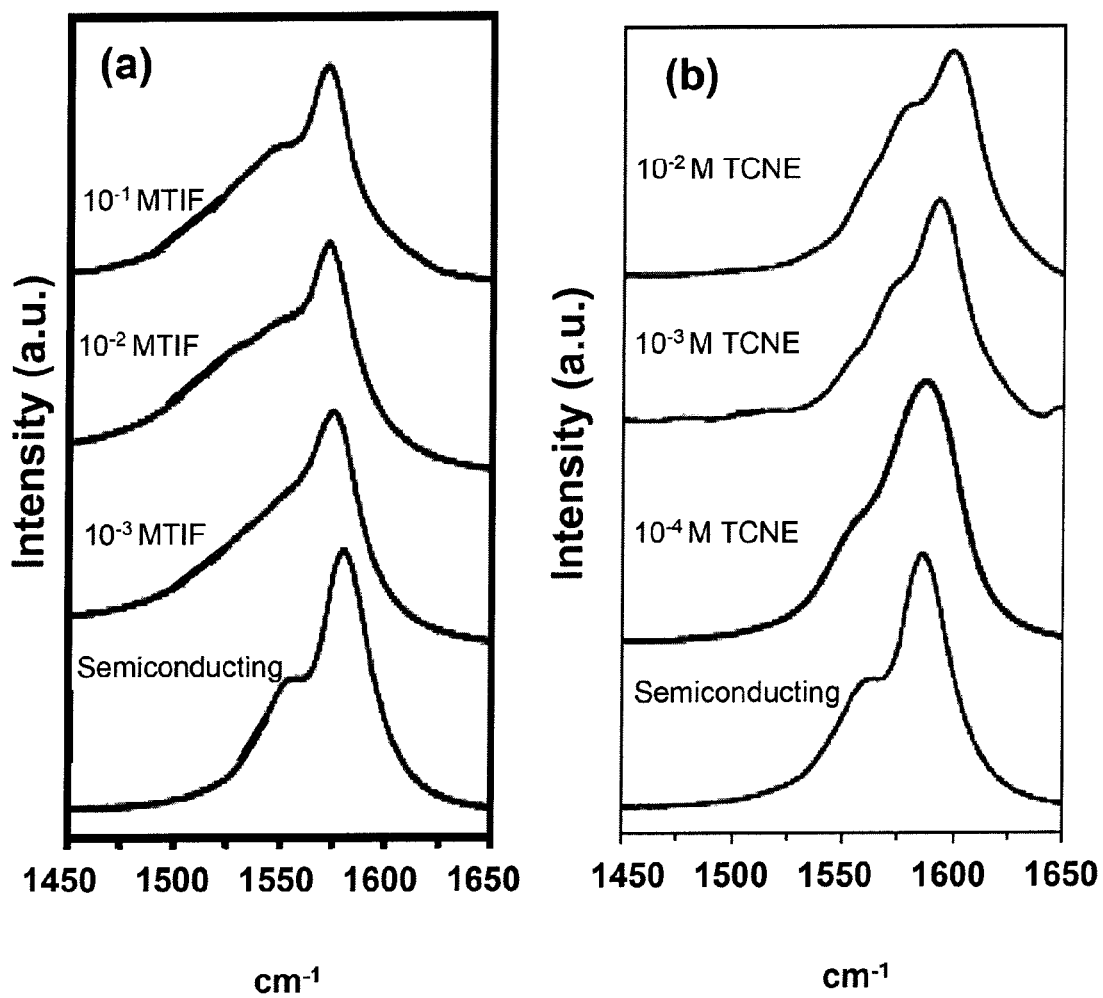
FIG. 8 is a graph depicting changes in the G-band of semi-conducting SWNTs on interaction with varying concentrations of (a) tetrathiafulvalene (TTF) and (b) TCNE obtained according to an embodiment described herein.

Upon interaction of an electron-donating molecule, TTF, with semiconducting carbon nanotubes, the 1540 $cm^{-1}$ feature appeared and increased significantly with an increase in the concentration of TTF (FIG. 8A). Without wishing to be bound by theory, it is believed that this remarkable change in the electronic structure of SWNTs is reversible.

Figure 9:
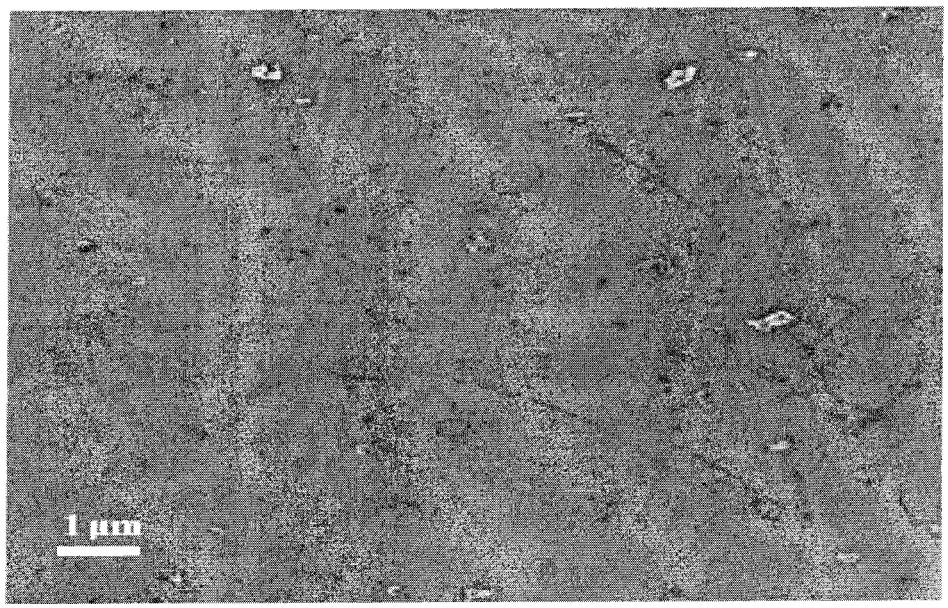
FIG. 9 illustrates FESEM images showing unbundled single-walled carbon nanotubes obtained according to an embodiment described herein.
Figure 9:
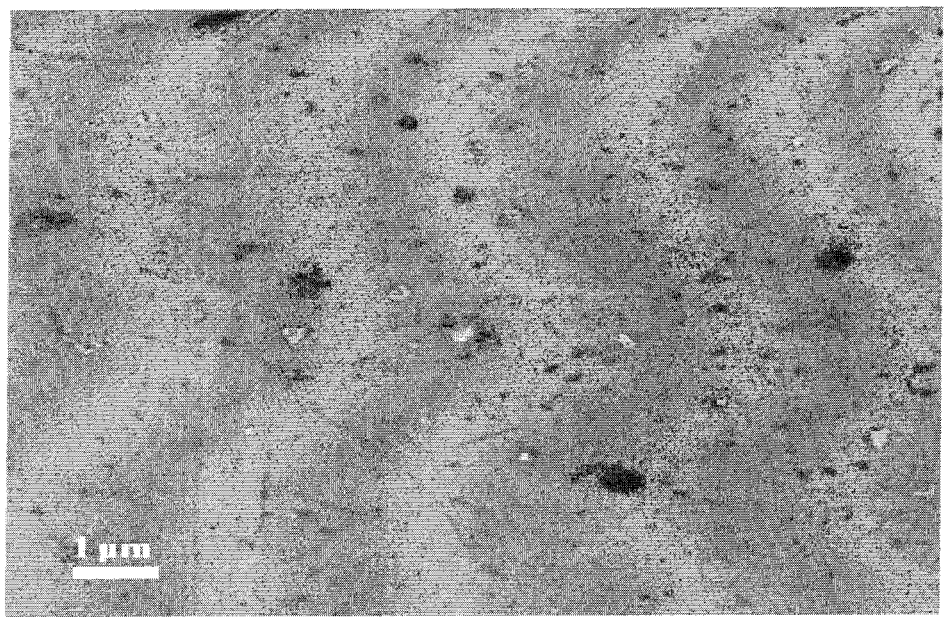

CONCLUSION: Effective separation of semiconducting and metallic SWNTs from the mixture was achieved by employing interaction with the potassium salt of coronene tetracarboxylic acid (Tables 1 and 2). The separation occurred due to molecular charge transfer between the potassium salt of coronene tetracarboxylic acid and SWNTs and was accompanied by the debundling of the SWNTs as evidenced by electron microscope images (FIG. 9).

TABLE 1

ENRICHMENT OF SWNTs WITH A 5 mM CONCENTRATION OF THE SEPARATION AGENT

|  | Original Pre-Treatment Mixture* | Precipitate | From Solution |
|---|---|---|---|
| Metallic SWNTs | 33% (0.33 mg) | 70% (0.33 mg) | — |
| Semiconducting SWNTs | 67% (0.67 mg) | 30% (0.1414 mg) | 100% (0.52 mg) |

*Original Pre-Treatment Mixture contained a total of 1 mg SWNTs.

TABLE 2

ENRICHMENT OF SWNTs WITH A 10 mM CONCENTRATION OF THE SEPARATION AGENT

|  | Original Pre-Treatment Mixture* | Precipitate | From Solution |
|---|---|---|---|
| Metallic SWNTs | 33% (0.33 mg) | 100% (0.33 mg) | — |
| Semiconducting SWNTs | 67% (0.67 mg) | — | 100% (0.67 mg) |

*Original Pre-Treatment Mixture contained a total of 1 mg SWNTs.

EXAMPLE 2

SWNT Separation Via a Potassium Salt of Coronene Octacarboxylic Acid

Single-walled carbon nanotubes having an admixture of semiconducting single-walled carbon nanotubes and metallic single-walled carbon nanotubes will be combined with a potassium salt of coronene-1,2,4,5,7,8,10,11-octacarboxylic acid in an aqueous solution to form a mixture. The mixture will be sonicated at 40° C. for 3 hours, and will be followed by heating at 75° C. for 10 hours. The resulting mixture will be set aside for 20 hours to form a precipitate including metallic single-walled carbon nanotubes. Adsorbed separation agent will be removed from the complexed semiconducting nanotubes by extensive washing with water. After excessive washing, the semiconducting nanotubes will be isolated as a precipitate.

EXAMPLE 3

SWNT Separation Via a Lithium Salt of Perylene Tetracarboxylic Acid

Single-walled carbon nanotubes having an admixture of semiconducting single-walled carbon nanotubes and metallic single-walled carbon nanotubes will be combined with an lithium salt of perylene-1,2,3,4-tetracarboxylic acid in an aqueous solution to form a mixture. The mixture will be sonicated at 50° C. for 3 hours, and will be followed by heating at 70° C. for 12 hours. The resulting mixture will be set aside for 24 hours to form a precipitate including metallic single-walled carbon nanotubes. Adsorbed separation agent will be removed from the complexed semiconducting nanotubes by extensive washing with water. After excessive washing, the semiconducting nanotubes will be isolated as a precipitate.

EXAMPLE 4

SWNT Separation Via a Potassium Salt of Chrysene Disulfonic Acid

Single-walled carbon nanotubes having an admixture of semiconducting single-walled carbon nanotubes and metallic single-walled carbon nanotubes will be combined with a potassium salt of chrysene-1,2-disulfonic acid in an aqueous solution to form a mixture. The mixture will be sonicated at 50° C. for 3 hours, and will be followed by heating at 75° C. for 12 hours. The resulting mixture will be set aside for 26 hours to form a precipitate including metallic single-walled carbon nanotubes. Adsorbed separation agent will be removed from the complexed semiconducting nanotubes by extensive washing with water. After excessive washing, the semiconducting nanotubes will be isolated as a precipitate.

EXAMPLE 5

SWNT Separation Via a Sodium Salt of Naphthalene Tetracarboxylic Acid

Single-walled carbon nanotubes having an admixture of semiconducting single-walled carbon nanotubes and metallic single-walled carbon nanotubes will be combined with a sodium salt of naphthalene-1,2,3,4-tetracarboxylic acid in an aqueous solution to form a mixture. The mixture will be sonicated at 50° C. for 3 hours, and will be followed by heating at 75° C. for 12 hours. The resulting mixture will be set aside for 33 hours to form a precipitate including metallic single-walled carbon nanotubes. Adsorbed separation agent will be removed from the complexed semiconducting nanotubes by extensive washing with water. After excessive washing, the semiconducting nanotubes will be isolated as a precipitate.

EXAMPLE 6

SWNT Separation Via a Sodium Salt of Pyrene Tetrasulfonic Acid

Single-walled carbon nanotubes having an admixture of semiconducting single-walled carbon nanotubes and metallic single-walled carbon nanotubes will be combined with a sodium salt of pyrene-1,2,6,8-tetrasulfonic acid in an aqueous solution to form a mixture. The mixture will be sonicated at 50° C. for 3 hours, and will be followed by heating at 70° C. for 12 hours. The resulting mixture will be set aside for 36 hours to form a precipitate including metallic single-walled carbon nanotubes. Adsorbed separation agent will be removed from the complexed semiconducting nanotubes by extensive washing with water. After excessive washing, the semiconducting nanotubes will be isolated as a precipitate.

EXAMPLE 7

SWNT Separation Via a Sodium Salt of Coronene Tetrasulfonic Acid

Single-walled carbon nanotubes having an admixture of semiconducting single-walled carbon nanotubes and metallic single-walled carbon nanotubes will be combined with a sodium salt of 4aH-coronene-1,2,2a,3-tetrasulfonic acid in an aqueous solution to form a mixture. The mixture will be sonicated at 50° C. for 3 hours, and will be followed by heating at 70° C. for 12 hours. The resulting mixture will be set aside for 29 hours to form a precipitate including metallic single-walled carbon nanotubes. Adsorbed separation agent will be removed from the complexed semiconducting nanotubes by extensive washing with water. After excessive washing, the semiconducting nanotubes will be isolated as a precipitate.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A composition comprising:
   at least one water-soluble complex comprising:
   a water-soluble separation agent including a planar portion, at least one π electron on the planar portion and at least one electron withdrawing group; and
   a semiconducting single-walled carbon nanotube,
   wherein the separation agent comprises a potassium salt of coronene-1,2,7,8-tetracarboxylic acid.

2. The composition of claim 1, wherein the complex is dissolved in an aqueous solution.

3. The composition of claim 2, wherein the aqueous solution further comprises a water-insoluble metallic single-walled carbon nanotube.

4. An composition comprising:
   a water-soluble separation agent including a planar portion, at least one π electron on the planar portion and at least one electron withdrawing group;
   a semiconducting single-walled carbon nanotube; and
   a water-insoluble metallic single-walled carbon nanotube;
   wherein the water-soluble separation agent selectively associates with the semiconducting single-walled carbon nanotube to form at least one water soluble complex,
   wherein the separation agent comprises a potassium salt of coronene-1,2,7,8-tetracarboxylic acid.

5. The composition of claim 4, wherein the water-soluble complex is dissolved in an aqueous solution.

* * * * *

UNITED STATES PATENT AND TRADEMARK OFFICE
CERTIFICATE OF CORRECTION

| | | Page 1 of 1 |
|---|---|---|
| PATENT NO. | : 8,580,223 B2 | |
| APPLICATION NO. | : 13/552417 | |
| DATED | : November 12, 2013 | |
| INVENTOR(S) | : Rao et al. | |

It is certified that error appears in the above-identified patent and that said Letters Patent is hereby corrected as shown below:

In the Specification

In Column 4, Line 28, delete "metllic" and insert -- metallic --, therefor.

In Column 8, Line 11, delete "it" and insert -- π --, therefor.

In Column 8, Line 34, delete "bluoranthene," and insert -- fluoranthene, --, therefor.

In Column 10, Line 48, delete "–F," and insert -- –F, –Cl, --, therefor.

In Column 15, Line 43, delete "PEI" and insert -- FEI --, therefor.

In Column 16, Line 12, delete "MEM" and insert -- FESEM --, therefor.

In Column 16, Line 28, delete "Len." and insert -- Lett. --, therefor

In the Claims

In Column 20, Line 9, in Claim 4, delete "An" and insert -- A --, therefor.

Signed and Sealed this
Fifteenth Day of April, 2014

Michelle K. Lee
*Deputy Director of the United States Patent and Trademark Office*